March 28, 1961     F. E. WILEY     2,977,351
PROCESS FOR RECOVERY OF POLYOLEFIN BY PRECIPITATION IN WATER
Filed June 28, 1956
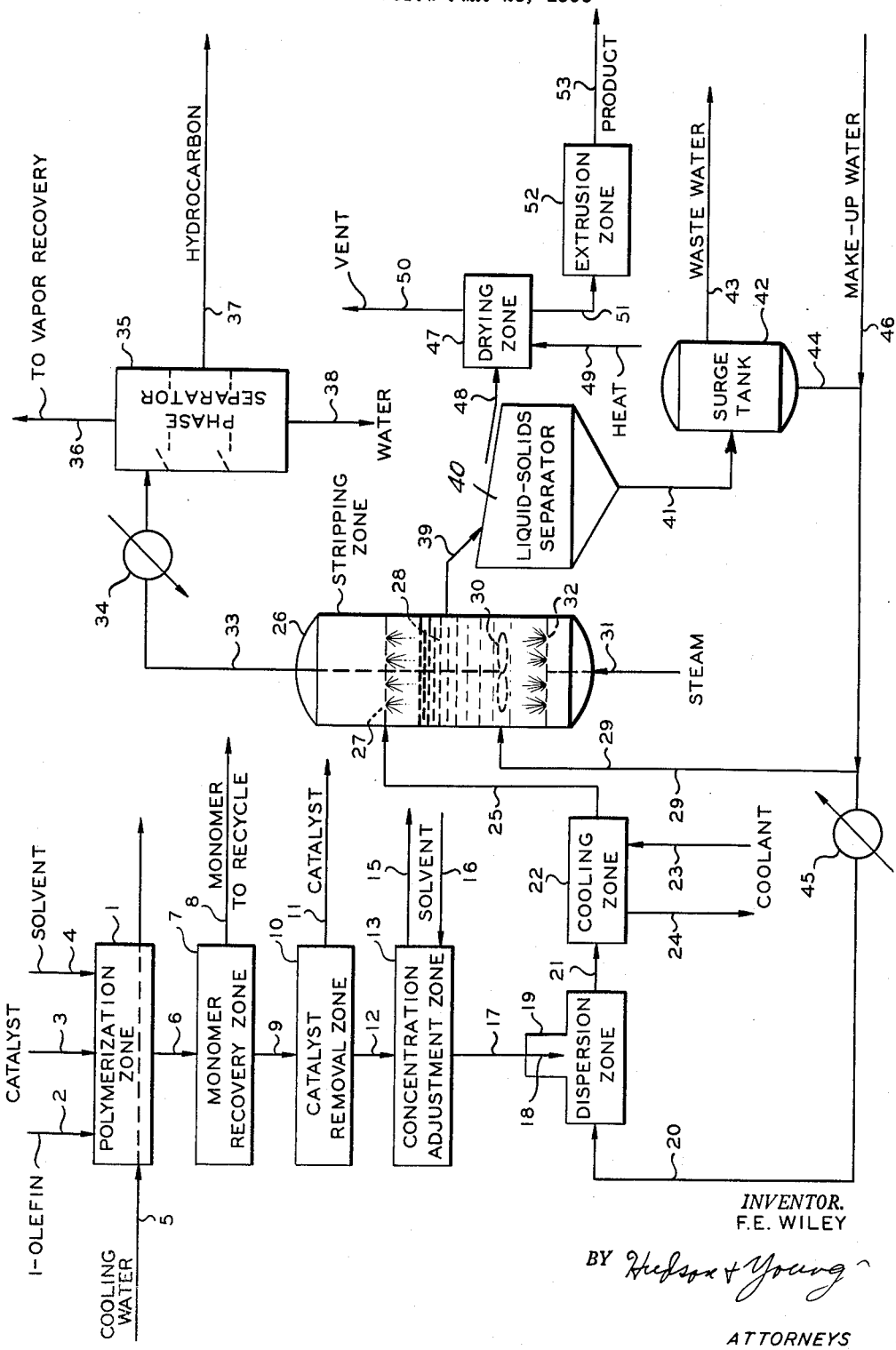
INVENTOR.
F.E. WILEY
BY *Hudson & Young*
ATTORNEYS

United States Patent Office 2,977,351
Patented Mar. 28, 1961

2,977,351

PROCESS FOR RECOVERY OF POLYOLEFIN BY PRECIPITATION IN WATER

Fred E. Wiley, Long Meadow, Mass., assignor to Phillips Petroleum Company, a corporation of Delaware Filed June 28, 1956, Ser. No. 594,591

5 Claims. (Cl. 260—94.9)

This invention relates to a novel process for the recovery of polymers of 1-olefins from hydrocarbon solutions thereof.

The method of this invention is applicable to recovery of solid olefin polymers from solvents broadly. It has particular application to recovery of solid polymers from the solvent used in the polymerization of 1-olefins. These polymers can be homopolymers or copolymers of one or more olefins.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan and Banks, filed March 26, 1956, and having Serial No. 573,877, now Patent No. 2,825,721, a process is disclosed for producing novel polymers of 1-olefins by carrying out the polymerization at a temperature in the range of 100 to 500° F. in the presence of 0.1 to 10 or more weight percent of chromium as chromium oxide, preferably including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high temperature treatment under nonreducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers. As has been indicated, this invention is applicable to recovery of polymeric 1-olefins from solution broadly and is particularly applicable to recovery of polymers from the solvent as prepared by the above-preferred method. However, polymers as prepared by other catalyst systems can be recovered by the method of this invention, e.g., polymers prepared by the organometallic catalyst as disclosed by Karl Ziegler, in Belgian Patent 533,362, November 16, 1954.

This invention is directed toward an improved method of recovering polymer from solution.

An object of the present invention is to provide an improved method of forming polymer granules from hydrocarbon solutions thereof.

In a different aspect, an object of this invention is to provide an improved method of stripping solvent from a dispersion of polymer granules, water and solvent.

Other objects, advantages and features of this invention will be apparent to those skilled in the art having been given this disclosure.

According to this invention, in one of its aspects, a solution of olefin polymers in a hydrocarbon solvent is dispersed as fine droplets into water at a temperature above the precipitation temperature of the polymer and the dispersion subsequently cooled to below the precipitation temperature of said polymer, the pressure and temperature conditions of the dispersion being maintained so as to prevent any substantial evaporation of the solvent or water. According to this invention, in its second aspect, a dispersion of solid polymer in water and hydrocarbon is passed to a stripping zone wherein the temperature is not more than 50° F., and preferably not more than 10° F., above the temperature of the said dispersion and sufficiently low pressure is maintained to evaporate the solvent.

An advantage of the first aspect of this invention is that the polymer is precipitated from very small droplets of solution dispersed in a non-solvent. As all droplets initially possess the same composition, the resulting precipitated particles will all possess identical molecular weight distributions and the possibility of producing agglomerates of very high or low molecular weight polymer is eliminated. Also, the high molecular weight polymer is precipitated when cooling first occurs followed by successively lower molecular weight fractions as the temperature is lowered. This high molecular weight material will be precipitated at the water interface of the solution droplet. Thus, the droplet will be rapidly encased by a layer of extremely low moisture transfer polymer. This action serves to maintain the droplet identity and prevent fractionation and, equally as important, to prevent water from entering the precipitating droplet. Thus, I obtain uniform drops of solvent dispersed in water with a precipitated polymer case enclosing the droplets. The solvent can now be removed by lowering the system pressure so that the solvent is evaporated and diffuses through the skin or by raiisng the temperature, in which case the film is ruptured.

When the dispersion is passed to a stripping zone at a temperature materially greater than the temperature of the dispersion zone, the rapid increase in temperature will frequently cause the formed spheres to rupture. Also, if this stripping temperature is higher than the precipitation temperature of the lower molecular weight material, some resolution takes place and the various particles become cemented together entrapping solvent and water. By the practice of this invention in its second aspect, no cementing takes place and the drying will consist essentially of surface drying.

As has been indicated, the polymer solution is dispersed in water as fine droplets. The most convenient means for accomplishing this is by the use of a suitable atomizing or spray nozzle mounted below the water level. While the direction of the spray nozzle is not critical, it is generally preferred to direct the nozzle parallel to the flow of the water stream into which the solution is being dispersed, i.e., concurrent flow of droplets and water. It will be understood by those skilled in the art that the nozzle design will be dependent upon pressure drop, flow rates, etc., it being within the skill of the art to provide the proper nozzle for the particular design.

As previously indicated, the polymeric materials to which this invention is particularly applicable are polymers of 1-olefins. Polymers of 1-olefins containing 2 to 8 carbon atoms and having no branching nearer the double bond than the 4-position have been found, in recent years, to have superior heat resistance and superior low temperature properties when polymerized at relatively low temperature and pressures. The above-identified methods of Hogan et al. is one such low temperature-low pressure method. As indicated above, it is preferable to carry out the polymerization in a hydrocarbon solvent. This invention has particular use in recovering the polymer from the solvent.

Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the polymerization temperature are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

In the preferred operation of this invention, a hot polymer solution having a concentration in the range of 2 to 5 percent polymer is dispersed as fine droplets into 1 to 10 volumes of water having a temperature above the precipitation temperature of the polymer under temperature and pressure conditions to maintain substantially all of the solvent and water in the liquid state. The dispersion is cooled to below the precipitation temperature under these pressure conditions and then the polymer-hydrocarbon-water dispersion is passed to a stripping zone containing water therein at a temperature not more than 10° F. above the dispersion temperature but under pressure conditions wherein the solvent is flashed. However, it should be understood that this invention is applicable to other concentrations both higher and lower and is operable with other water to solution ratios. It should also be understood that the dispersion formed by dispersion first in hot water and later cooled can be flash evaporated in a stripping zone of considerably higher temperature and still obtain the advantages of the precipitation method, and shock cooled, i.e., rapidly precipitated, polymer can be stripped by the method as herein described and still obtain the advantages of this step. However, to obtain uniform, non-ruptured spheres, both steps are employed.

As has been previously indicated, the initial dispersion temperature and the stripping zone temperature are important in obtaining the maximum advantage of this invention. These temperatures will vary for different polymers and for different solvents. However, having been given the concept, it is within the skill of the art to determine the maximum temperature for the given solution. For example, when it is desired to recover polyethylene as prepared by the Hogan et al. method, the hot solution at about 240° F. is dispersed in about three volumes of water at not less than about 170° F. and preferably at about 190° F., the dispersion cooled to about 130° F. and this dispersion passed to a stripping zone having a temperature of 130 to 140° F. and pressure of 5.5 to 7 p.s.i.a. wherein the solvent is removed by evaporation. The polymer in water is then separated and dried.

This invention will be further described by reference to the attached drawing which is a block flow diagram of a typical process incorporating both steps of the invention as used in recovering polymer as prepared by the Hogan et al. method.

Referring now to the drawing, a feed stream consisting essentially of the polymerizable 1-olefin, ethylene for example, is passed to polymerization zone 1 via conduit 2. Catalyst is introduced to said polymerization zone via conduit 3. The catalyst will usually be dispersed in at least a portion of the solvent. Any additional solvent, cyclohexane for example, is added to polymerization zone 1 via conduit 4. The ingredients in each of these conduits 2, 3 and 4 are preferably at polymerization temperature (230 to 300° F.), however, one or more streams can be cooler with remaining streams warmer so that the resulting dispersion is at the proper temperature. It should also be understood that the 1-olefin and solvent can be premixed, if desired. The polymerization reaction is exothermic so that it is necessary to remove heat from the polymerization zone. This can be accomplished by indirect heat exchange, for example, cooling water in conduit 5. The polymerization zone effluent, at about 289° F. from zone 1 passes via conduit 6 to monomer removal zone 7 wherein unreacted ethylene is vaporized and removed via conduit 8 to ethylene recycle. The mixture passes from monomer removal zone 7 via conduit 9 to catalyst removal zone 10, wherein the catalyst is removed from the polymer solution. The catalyst is removed via conduit 11. The polymer solution passes from separation zone 10 via conduit 12 to concentration adjustment zone 13. In general, the polyethylene concentration in conduit 12 is low and solvent is removed from zone 13 via conduit 15. On the other hand, if the concentration is high, solvent can be added via conduit 16. The solution is also cooled in this zone, preferably to the desired dispersion temperature of say 200° F. This concentration adjustment zone is not necessarily required, but is advantageous in that the load on the steam stripping zone can be reduced by partially removing solvent here. It is also not necessary to do any cooling in this zone, however, the solvent removal can be accomplished by dropping pressure and the cooling results therefrom. The polyolefin concentration is generally adjusted to between 2 and 5 weight percent, however, as has been indicated, the operability of the invention is not dependent upon this step. In any case, the solution passes via conduit 17 to nozzle 18 wherein the solution is sprayed as fine droplets into water above the precipitation temperature of the polymer in dispersion zone 19. Hot water, usually at the same temperature as the solution, but in any case above the precipitation temperature of the polymer, enters zone 19 via conduit 20. The resulting dispersion passes via conduit 21 to cooling zone 22, wherein it is cooled by indirect heat exchange with cooling water entering this zone via conduit 23 and leaving via conduit 24. Other cooling systems can be used, for example, cool water can be added directly to the stream in an amount sufficient to reduce the temperature to the desired level. In any case, the temperature is lowered to below the precipitation temperature, in the case of polyethylene below 150° F. and preferably to a temperature within the range of 130 to 140° F. The dispersion now containing solid polymers then passes via conduit 25 to stripping zone 26. Up to this point, sufficient pressure is maintained on the system to prevent any substantial vaporization of solvent from the dispersion. In the embodiment shown, the dispersion is sprayed through a vapor zone via nozzles 27 into the hot water as shown by interface 28. However, the dispersion can enter directly into the hot water in this zone, for example, via recycle conduit 29. Since the polymer has a tendency to float, stirrer 30 is provided to keep the polymer in dispersion. A heat supply, in this example steam, is admitted to the stripping zone 26 via conduit 31 and nozzles 32. In the preferred embodiment of this invention and in accordance with one of its aspects, the temperature is maintained at not more than 10° F. above the temperature of the dispersion. In order to maintain vaporization of solvent, the pressure must be regulated. In the case of cyclohexane solvent, for a temperature of about 130° F., the pressure is maintained at about 5.5 p.s.i.a. and for 140° F. at 7 p.s.i.a. In any case, vapors of solvent and water pass overhead via conduit 33 to condenser 34 and into separator 35. The non-condensed material is removed from separator 35 via conduit 36 to vapor recovery zone, not shown, the solvent is removed to solvent recovery zone, not shown, via conduit 37 and water is removed via conduit 38.

The polymer residence time in stripping zone 26 is in the range of 20 to 30 minutes. Polymer in water slurry passes from zone 26 via conduit 39 to separation zone 40. One convenient means for separating the polymer from water is a skimmer tank, however, any suitable means can be employed. Water from separation zone 40 passes via conduit 41 to surge tank 42. Conduit 43 is provided in surge tank 42 to remove excess water if required. The necessity for removing or adding water will be determined by the net loss or gain of water in stripping zone 26. The water in tank 42 will be about the temperature maintained in said stripping zone 26, e.g., 130 to 140° F. in this example. This water is removed from surge tank 42 via conduit 41 and is recycled partially to stripping zone 26 via conduit 29 and partially to the dispersion zone 19 via conduit 20. Heater 45 is provided in conduit 20 to raise the temperature to the desired dispersion temperature, e.g., 200° F. Make-up water can be admitted to the recycle conduit 44 via conduit 46 as required.

The polymer from liquid-solids separation zone 40 is passed, still damp, but having the solvent essentially replaced by water, to drying zone 47 via conduit 48. Heat is introduced into drying zone 51 via conduit 52. In this embodiment, a forced draft dryer using air at 250° F. will dry the polymer to 99.7 percent solids with a residence time in the range of 2 to 4 hours. Vapors are taken overhead via conduit 50. The dried polymer is removed via conduit 51 to extrusion zone 52 wherein the polymer is compacted preparatory to shipping or storing. The compacted polymer product is removed via conduit 53.

In the above description and in the drawing, valves, pumps, etc., are omitted, it being within the skill of the art to supply these. In said description, certain modifications have been indicated, however, those skilled in the art will recognize that many such modifications can be made and still obtain the benefits of this invention.

*Example*

This invention will be further described by illustrating a specific embodiment wherein polyethylene as prepared by the method of Hogan et al., supra, is recovered from cyclohexane solvent used in the polymerization. The solution containing 3.5 percent polymer is cooled to 200° F. and is dispersed by means of a Binks No. F–101–106 Roto-Jet spray nozzle as finely divided droplets and at a rate of 75 gallons per hour into 150 gallons per hour of water having a temperature of 200° F. The resulting dispersion is cooled by indirect heat exchange with 200 gallons of water per hour having an inlet temperature to the exchange means of 100° F. and an outlet temperature of 160° F. The dispersion temperature after cooling is 135° F. The pressure on these dispersion and cooling zones is 45 pounds per square inch gauge. The dispersion is then sprayed through suitable nozzles such as Binks–120–122 Roto-Jet nozzles into a steam stripping zone containing 125 gallons of water at 135° F. and under a pressure of 6 p.s.i.a. The pressure drop across the dispersion nozzle is 50 p.s.i. and across the tank nozzle is 53.7 p.s.i. Steam is admitted to this stripping zone at a rate to maintain the desired temperature and the residence time of the polymer in this zone is about 25 minutes. The polymer is then separated from water by first passing over a skimmer screen and subsequently drying in a forced draft dryer using air at 250° F. and a residence time of 4 hours. The polymer is dried to 99.7% solids. The product is spherical and of uniform size of approximately 30 microns in diameter.

I claim:

1. A process for recovering polyethylene from solution in a solvent selected from the group consisting of paraffins and cycloparaffins, said process comprising dispersing said solution as fine droplets into water at a ratio within the range of 1 to 10 volumes water per volume of solution, said water being above the precipitation temperature of polyethylene; cooling the resulting solution in water dispersion to below the precipitation temperature of polyethylene; maintaining the pressure on the dispersion zone and cooling zone sufficiently high to maintain said solvent and said water in liquid phase until said polyethylene is substantially precipitated; steam stripping the solvent from the water and polymer and thereafter recovering the polymer from the resulting water dispersion thereof.

2. A process for recovering polyethylene from solutions thereof in cyclohexane, said process comprising adjusting the concentration of said solution to a concentration within the range of 2 to 5 weight percent polyethylene, dispersing the resulting solution as fine droplets into water in a volume ratio within the range of 1 to 10 volumes water per volume of solution so that the resulting solution in water dispersion will have a temperature of not less than 170° F., cooling the resulting dispersion to a temperature not higher than 140° F., thereby precipitating polyethylene, maintaining the solvent and water in liquid phase during the said dispersion and cooling steps, passing the resulting cyclohexane-water-polymer dispersion to an agitated steam stripping zone containing hot water therein at a temperature not more than 50° F. above the temperature of the second said dispersion, maintaining a lower pressure in said agitated steam stripping zone so as to evaporate cyclohexane at the temperature therein, and thereafter separating solid polymer from the resulting dispersion of polymer in water.

3. A process for recovering solid polymers of olefins having 2 to 8 carbon atoms per molecule and no branching nearer the double bond than the 4-position from solution in a hydrocarbon solvent, said process comprising dispersing said solution as a plurality of fine droplets into water, said water being above the precipitation temperature of said polymer, cooling the resulting solution in water dispersion to below the precipitation temperature of said polymer, maintaining the pressure on the dispersion zone and cooling zone sufficiently high to maintain said solvent and said water in liquid phase until said polymer is substantially precipitated, and thereafter recovering said polymer from the liquids.

4. A process for recovering solid polymers of olefins from solution in a hydrocarbon solvent, said polymers having been prepared by polymerizing 1-olefins of 2 to 8 carbon atoms per molecule and no branching nearer the double bond than the 4-position in a hydrocarbon solvent and in the presence of a chromium oxide catalyst, said process comprising dispersing said solution as a plurality of fine droplets into water, at a ratio within the range of 1 to 10 volumes water per volume of solution, said water being above the precipitation temperature of said polymer, cooling the resulting solution in water dispersion to below the precipitation temperature of said polymer, maintaining the pressure on the dispersion zone and cooling zone sufficiently high to maintain said solvent and said water in liquid phase until said polymer is substantially precipitated, steam stripping the solvent from the water and polymer and thereafter recovering the polymer from the resulting water dispersion thereof.

5. A process for recovering a solid ethylene polymer from solution in a hydrocarbon solvent, said process comprising dispersing said solution as a plurality of fine droplets into water, said water being above the precipitation temperature of said polymer, cooling the resulting solution in water dispersion to below the precipitation temperature of said polymer, maintaining the pressure on the dispersion zone and cooling zone sufficiently high to maintain said solvent and said water in liquid phase until said polymer is substantially precipitated, and thereafter recovering said polymer from said solvent and said water.

References Cited in the file of this patent

UNITED STATES PATENTS

| | | |
|---|---|---|
| 2,530,144 | Bannon | Nov. 14, 1950 |
| 2,537,130 | Green | Jan. 9, 1951 |
| 2,719,143 | Van Dijk et al. | Sept. 27, 1955 |
| 2,731,452 | Field et al. | Jan. 17, 1956 |
| 2,766,224 | Bannon | Oct. 9, 1956 |
| 2,838,477 | Roelen | June 10, 1958 |
| 2,858,902 | Cottle | Nov. 4, 1958 |

FOREIGN PATENTS

| | | |
|---|---|---|
| 571,814 | Great Britain | Sept. 11, 1945 |
| 609,560 | Great Britain | Oct. 4, 1948 |